US011499462B2

(12) United States Patent
Maguin

(10) Patent No.: US 11,499,462 B2
(45) Date of Patent: Nov. 15, 2022

(54) LIQUID STORAGE DEVICE FOR A MOTOR VEHICLE

(71) Applicant: VITESCO TECHNOLOGIES GMBH, Hannover (DE)

(72) Inventor: Georges Maguin, Toulouse (FR)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 17/438,813

(22) PCT Filed: Mar. 13, 2020

(86) PCT No.: PCT/EP2020/056956
§ 371 (c)(1),
(2) Date: Sep. 13, 2021

(87) PCT Pub. No.: WO2020/183010
PCT Pub. Date: Sep. 17, 2020

(65) Prior Publication Data
US 2022/0127990 A1      Apr. 28, 2022

(30) Foreign Application Priority Data
Mar. 14, 2019   (FR) ...................... 1902606

(51) Int. Cl.
*F01N 1/00*      (2006.01)
*F01N 3/20*      (2006.01)
(52) U.S. Cl.
CPC ........ *F01N 3/2066* (2013.01); *F01N 2610/02* (2013.01); *F01N 2610/1406* (2013.01);
(Continued)

(58) Field of Classification Search
CPC ......... F01N 2610/1406; F01N 2610/02; F01N 2610/1433; F01N 2610/1426; F01N 3/2066
(Continued)

(56) References Cited

U.S. PATENT DOCUMENTS 3,691,620 A      9/1972   Harr
5,988,213 A *   11/1999   Yoshioka ............. F02M 37/106
                                                                                      137/590
(Continued)

FOREIGN PATENT DOCUMENTS

DE   10 2005 058 248      1/2007
DE   10 2011 010 625      8/2011
(Continued)

OTHER PUBLICATIONS

International Search Report and Written Opinion of the ISA for PCT/EP2020/056956 dated Apr. 14, 2020, 10 pages.

*Primary Examiner* — Jason D Shanske
(74) *Attorney, Agent, or Firm* — Nixon & Vanderhye

(57) ABSTRACT

Disclosed is a device for storing a liquid for a motor vehicle, the device including a reservoir, including a bottom wall, a pump, mounted at an orifice formed at the bottom wall and including at least one portion extending through the orifice and including at least one suction nozzle, a filter mounted on the at least one portion of the pump at the at least one suction nozzle, and a mat arranged inside the reservoir at least partly on the bottom wall, the mat being able to move the liquid by capillarity and including a so-called "contact" portion being in contact with the filter at a contact surface in order to convey the liquid by capillarity to the filter.

20 Claims, 3 Drawing Sheets

(52) U.S. Cl.
CPC ............... *F01N 2610/1426* (2013.01); *F01N 2610/1433* (2013.01)

(58) Field of Classification Search
USPC .......................................................... 60/272
See application file for complete search history.

(56) References Cited

U.S. PATENT DOCUMENTS

| | | | | |
|---|---|---|---|---|
| 6,065,452 | A | * | 5/2000 | Yoshioka ............... F02M 37/46 |
| | | | | 123/509 |
| 6,283,731 | B1 | * | 9/2001 | Yoshioka ........... B01D 35/0273 |
| | | | | 137/574 |
| 9,103,260 | B2 | | 8/2015 | Maguin et al. |
| 9,249,709 | B2 | * | 2/2016 | Hodgson ............... F01N 3/2066 |
| 9,335,199 | B2 | * | 5/2016 | Hodgson ............... G01F 23/242 |
| 11,014,446 | B2 | | 5/2021 | Tipton et al. |
| 2005/0284871 | A1 | * | 12/2005 | Leonard ............... B65D 39/086 |
| | | | | 220/562 |
| 2011/0192786 | A1 | | 8/2011 | Nagai et al. |
| 2014/0174058 | A1 | * | 6/2014 | Maguin ................. F01N 3/2066 |
| | | | | 422/168 |
| 2016/0332742 | A1 | | 11/2016 | Chan et al. |

FOREIGN PATENT DOCUMENTS

| | | |
|---|---|---|
| GB | 1129894 | 10/1968 |
| WO | 2013/020924 | 2/2013 |
| WO | 2016/073978 | 5/2016 |

\* cited by examiner

LIQUID STORAGE DEVICE FOR A MOTOR VEHICLE

This application is the U.S. national phase of International Application No. PCT/EP2020/056956 filed Mar. 13, 2020 which designated the U.S. and claims priority to FR Patent Application No. 1902606 filed Mar. 14, 2019, the entire contents of each of which are hereby incorporated by reference.

BACKGROUND OF THE INVENTION

Field of the Invention

The invention relates to the delivery of a liquid stored in a reservoir to a pump and more particularly to a device for storing a liquid for a motor vehicle comprising a reservoir and a pump mounted on a wall of said reservoir. The invention applies in particular to the device for storing water or urea solutions in motor vehicles.

Description of the Related Art

Nowadays, certain motor vehicles with an engine include in a known manner a storage device comprising a so-called "urea" reservoir which makes it possible to inject a urea solution into the gases discharged by the engine in order to reduce their harmfulness in the atmosphere. Likewise, certain motor vehicles include a storage device comprising a so-called "water" reservoir making it possible to inject a water solution in order to control the temperature of certain engine components, for example the combustion chambers or a turbocharger, or to control the emissions of harmful gases such as, for example, nitrogen dioxide.

In a known solution, such a urea or water reservoir comprises in a known manner a pump mounted at an orifice formed at the bottom of the reservoir in order to suck the liquid and convey it out of the reservoir so that it is introduced by an injector into a component of the vehicle (catalytic converter, combustion chambers, etc.). In order to prevent debris or contaminants contained in the liquid from being sucked by the pump and clogging the injector, it is known to place a filter between the liquid and the suction nozzle of the pump located in the reservoir.

A problem arises, however, when the vehicle is traveling on an inclined surface, for example on a hill. In fact, in this case, the partially filled reservoir is also inclined so that, in some cases, the liquid may no longer be in contact with the filter, which prevents it from being sucked by the pump and from being injected, then causing losses of liquid availability by uncontrolled air suction. In the case of a urea reservoir, a failure to inject urea solution into the exhaust gases increases the level of pollution of the vehicle, sometimes beyond regulatory standards. In addition, failure to comply with emission standards leads to reduced engine performance, which can lead to failure thereof. In the case of a water reservoir, a water injection fault can lead to overheating, for example in the combustion chambers or in the turbocharger, which can lead to a reduction in vehicle performance in order to preserve the engine. In both cases, a known solution consists in detecting a liquid injection fault and ordering the engine to be switched off or its operation in a deliberately degraded mode, but this then also presents a significant drawback.

In addition, the evolution of vehicles leads more and more to reducing the height of these reservoirs to make them as flat as possible in order to reduce their size and preserve the ground clearance of the vehicle, which tends to reduce the height of liquid in the reservoir and makes it even more complex to suck the liquid by the pump on an inclined surface.

SUMMARY OF THE INVENTION

The object of the invention is therefore to remedy at least in part these drawbacks by proposing a simple, reliable and effective solution for sucking the liquid both when the reservoir is horizontal and when the reservoir is inclined over the extent of level variation allowed.

To this end, the invention firstly relates to a device for storing a liquid for a motor vehicle, said device comprising:
  a reservoir, comprising a bottom wall,
  a pump, mounted at an orifice formed at said bottom wall and comprising at least one portion extending through said orifice comprising at least one suction nozzle, and
  a filter mounted on the at least one portion of the pump at said at least one suction nozzle,
said device being noteworthy in that it further comprises a mat arranged inside the reservoir at least in part on the bottom wall, said mat being able to move the liquid by capillarity and comprising a so-called "contact" portion being in contact with the filter at a contact surface in order to convey the liquid by capillarity to said filter.

The draining mat makes it possible to easily convey the liquid to the filter by capillarity so as to avoid liquid pressure drops in the pump when the reservoir is inclined. Such conveying also makes it possible to bring the liquid permanently closer to the pump so that the heat released by the pump in operation thaws the liquid or prevents it from freezing, as the case may be. The contact portion also advantageously makes it possible to preserve the filter from debris of a larger size by constituting a pre-filter, so as to extend the service life of said filter. The mat also makes it possible to insulate the reservoir from the inside in order to reduce heat losses, in particular when a convection heating module is mounted inside the reservoir.

Preferably, the liquid is a solution of urea, for example a mixture of urea and water or alcohol or water with or without an added agent for controlling the growth of bacteria.

According to one aspect of the invention, the pressure in the reservoir corresponds substantially to atmospheric pressure, the liquid not being moved by a pressurized flow.

Preferably, the mat is made of a material of cellular type, for example a foam, in particular of "open cells" type, for example a synthetic one, polyurethane, polyethylene or any other suitable material providing the same function.

Advantageously, the contact between the contact portion of the mat and the filter is produced by elasticity.

As a variant or in addition, the device may comprise a clamping member such as, for example, a strapping, a ring or a collar.

Preferably, the contact surface between the contact portion of the mat and the filter is greater than one third of the total external surface of the filter capable of being in direct contact with the liquid contained in the reservoir. The mat thus increases the service life of the filter at the contact portion.

More preferably, the contact surface between the contact portion of the mat and the filter is greater than 50 cm$^2$ in order to drain the liquid toward the filter efficiently.

In one embodiment, the mat comprises a single layer to simplify the manufacture and the cost of the device.

As a variant, the mat comprises a plurality of layers, allowing a plurality of functions.

In one embodiment, the mat comprises a first layer arranged on the bottom wall, and a second layer, arranged on the first layer.

Preferably, the density of the second layer is less than the density of the first layer in order to allow storage of liquid by the second layer and drainage of liquid by the first layer.

Advantageously, the density in terms of number of pores per inch of the first layer is between 40 ppi or pores per inch (15.7 pores/cm) and 50 ppi (19.7 pores/cm), for example of the order of 45 ppi (17.7 pores/cm).

More advantageously, the density in terms of number of pores per inch of the second layer is between 25 ppi (9.8 pores/cm) and 35 ppi (13.8 pores/cm), for example of the order of 30 ppi (11.8 pores/cm).

In one embodiment, the filter extends along an axis or a longitudinal plane orthogonal to the plane along which the bottom wall of the reservoir extends.

In another embodiment, the filter extends along an axis or a longitudinal plane parallel to the plane along which the bottom wall of the reservoir extends.

According to one feature of the invention, the mat is fixed to the bottom wall of the reservoir using fastening members. These fastening members can for example be in the form of screws or of clip systems.

In one embodiment, the lowest density of the material constituting the mat is less than the density of urea.

The invention also relates to a motor vehicle comprising a storage device as described above.

BRIEF DESCRIPTION OF THE DRAWINGS

Other features and advantages of the invention will become more apparent upon reading the following description. This description is purely illustrative and must be read with reference to the attached drawings, in which.

DESCRIPTION OF THE PREFERRED EMBODIMENTS

Figure 1:
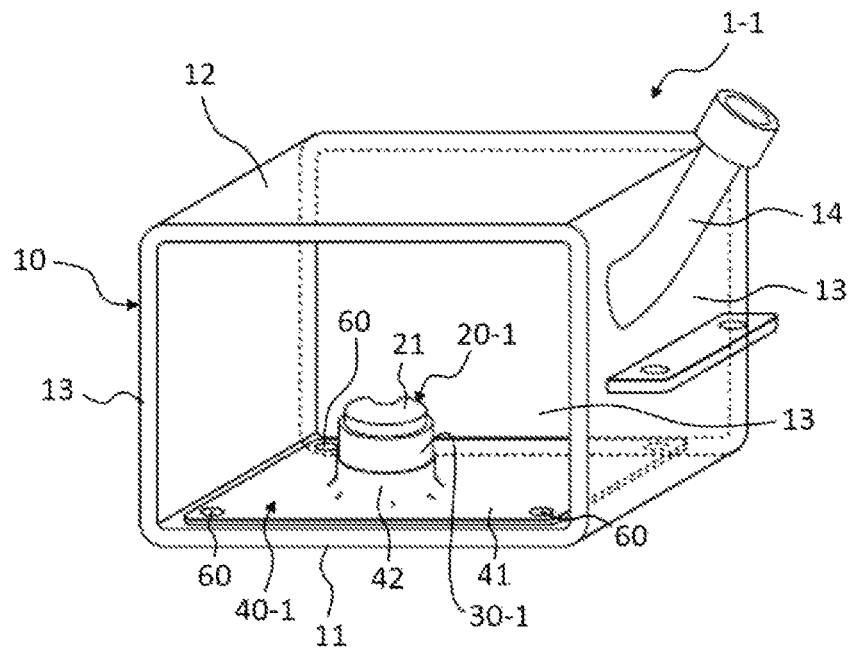
FIG. 1 is a partial perspective and sectional view of a first embodiment of the device according to the invention.

There is shown in FIG. 1 a first embodiment of the liquid storage device 1-1 according to the invention.

Figure 5:
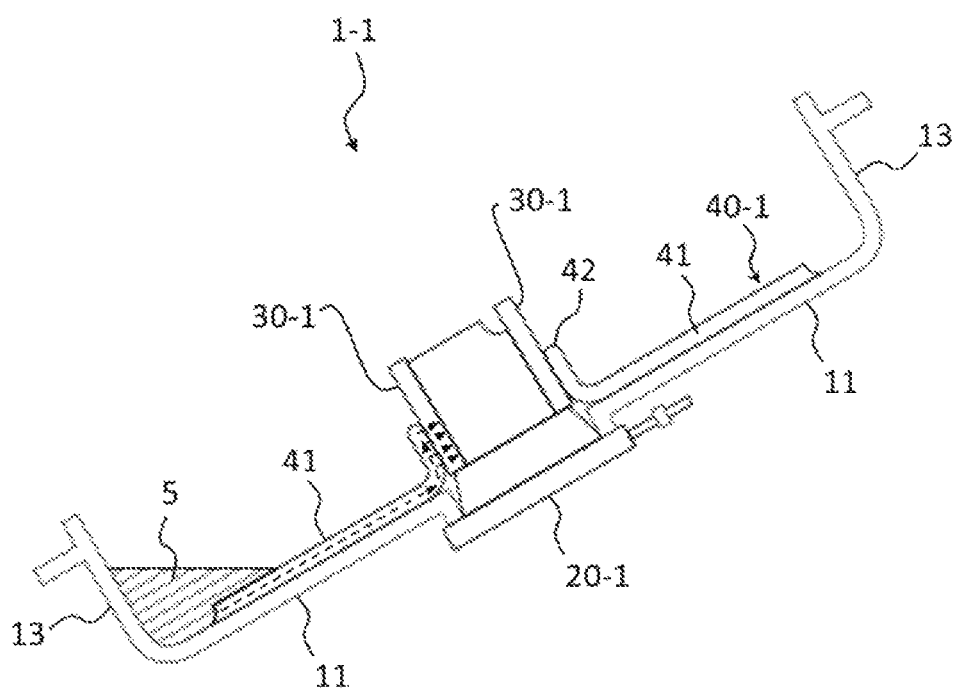
FIG. 5 is a partial perspective and sectional view of a device of FIGS. 1 and 2 inclined relative to the terrestrial horizontal.

The device 1-1 according to the invention is intended to be mounted in a motor vehicle (not shown) in order to store a liquid 5 (visible in FIG. 5).

To this end, the device 1-1 comprises a reservoir 10, a pump 20-1, a filter 30-1 and a liquid 5 conveying member in the form of a mat 40-1.

In this example, the reservoir 10 is substantially of parallelepipedal shape. However, as a variant, the reservoir 10 could have any other shape, in particular a shape suitable for its integration into the vehicle. The reservoir 10 comprises in particular a lower wall, called "bottom" wall 11, an upper wall 12, side walls 13 and an introduction duct 14 for the liquid 5, mounted in this example on one of the side walls 13 and allowing the reservoir 10 to be filled with the liquid 5.

The reservoir 10 may contain a urea solution in order to control the emissions of harmful gases such as, for example, nitrogen dioxide and thereby reduce the pollution level of the vehicle. The reservoir 10 may contain a water solution in order to control the temperature in certain engine components, for example the combustion chambers or a turbocharger. The reservoir 10 can contain a pressurized cleaning solution necessary for the proper functioning of driving assistance sensors such as radars and cameras.

Figure 2:
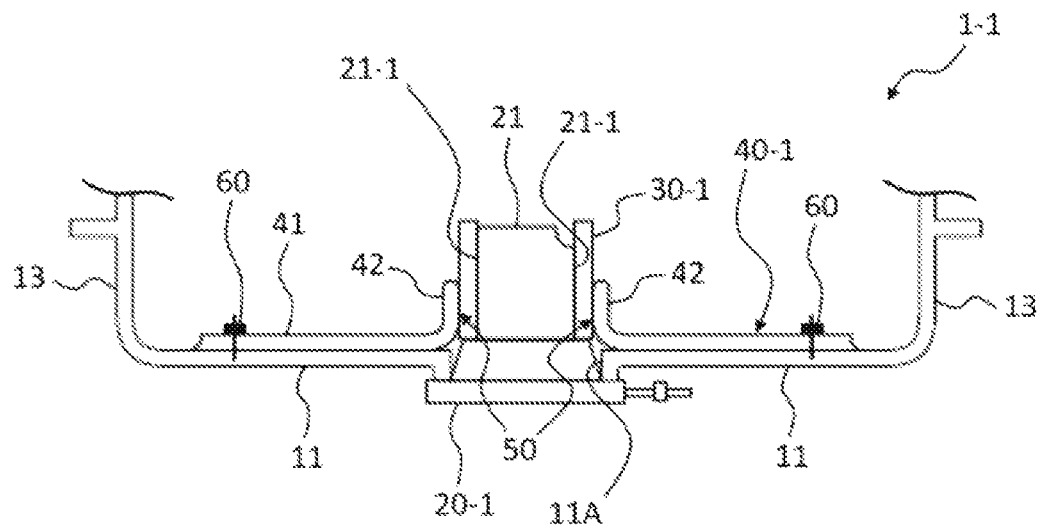
FIG. 2 is a partial cross-sectional view of the device of FIG. 1.

Referring to FIGS. 1 and 2, the pump 20-1 is mounted at an orifice 11A formed at the bottom wall 11 of the reservoir 10. In this example, the pump 20-1 comprises a portion of substantially cylindrical shape 21 of circular section which extends through the orifice 11A orthogonally to the plane of the bottom wall 11. This cylindrical portion 21 comprises a so-called "useful" external surface 21-1 in contact with the filter 30-1 and onto which open one or more suction nozzles (not visible) for the liquid 5.

The filter 30-1 is mounted around the cylindrical portion 21 of the pump 20-1 and also extends through the orifice 11A of the bottom wall 11, orthogonally to the plane of said bottom wall 11. The filter 30-1 is mounted at the suction nozzle(s) to prevent debris or contaminants from entering the pump 20-1. The internal surface of the filter 30-1 is thus in contact with the useful external surface 21-1 of the pump 20-1 while the external surface of the filter 30-1 is directly exposed to the liquid 5 as well as to the gases contained in the reservoir 10.

The mat 40-1 is arranged inside the reservoir 10 and comprises a first portion 41 arranged at least in part on the bottom wall 11 of the reservoir 10. The mat 40-1 is made of a material making it possible to move the liquid 5 contained in the reservoir 10 by capillarity. For example, this material may consist of a suction foam, for example with open cells made for example of polyurethane, polyether, polyester, polyurethane or any suitable material. The density in terms of number of pores per inch of the mat 40-1 may for example be between 20 and 60 ppi (pores per inch), that is to say substantially between 7.87 pores per centimeter and 23.62 pores per centimeter.

The mat 40-1 comprises a second portion, called "contact" portion 42, being in contact with the filter 30-1 at a contact surface 50 in order to convey the liquid 5 by capillarity to said filter 30-1 via said contact surface 50. This contact surface 50 represents the junction between the contact portion 42 and the filter 30-1.

In this first embodiment, the mat 40-1 is curved so that the contact between the contact portion 42 of the mat 40-1 and the filter 30-1 is made by elasticity but without specific pressure apart from the contact itself in order to ensure an efficient passage of the liquid 5 through the filter 30-1. The contact portion 42 thus extends orthogonally to the first portion 41 of the mat 40-1, which is in contact with the bottom wall 11. It will further be noted that, in another embodiment, the edges of the mat 40-1 could also at least partially cover the lower part of the side walls 13 in order to increase the contact surface of the mat 40-1 with the liquid 5, in particular when the reservoir 10 is inclined or virtually empty of liquid 5.

In this first embodiment, the device 1-1 could also comprise a clamping member (not shown), for example in the form of a strapping, a ring or a collar in order to maintain the contact portion 42 of the mat 40-1 pressed against the filter 30-1, in particular when the reservoir 10 is inclined or subjected to vibrations. This strapping could for example be made of plastic or of any suitable material.

In this first embodiment, the mat comprises a single layer, the thickness of which is for example between 10 and 30 mm.

Figure 3:
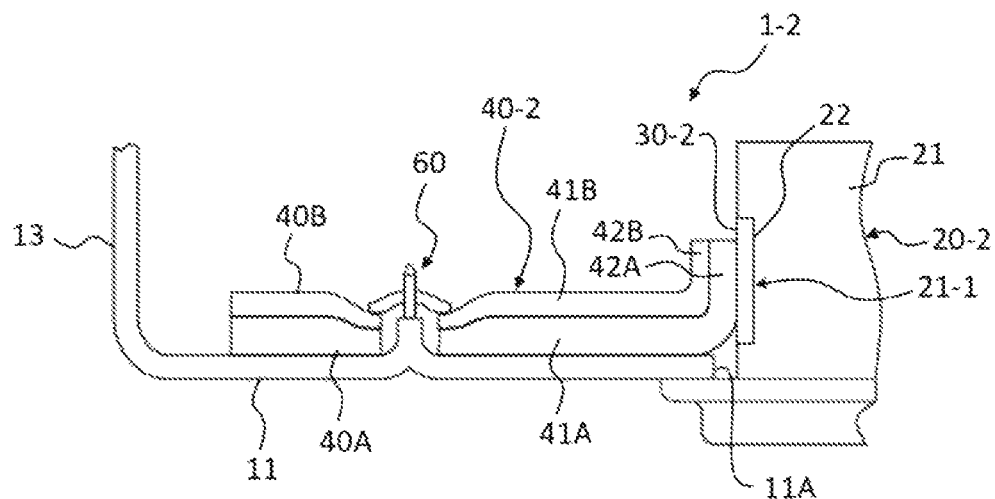
FIG. 3 is a partial perspective and sectional view of a second embodiment of the device according to the invention.

There is shown in FIG. 3 a second embodiment of the device 1-2 according to the invention. This second embodiment differs from the first embodiment in that the filter 30-2 is mounted in a housing 22 formed in the cylindrical portion 21 of the pump 20-2 and in that the mat 40-2 comprises two superposed layers 40A, 40B. The first layer 40A is arranged on the bottom wall 11 and the second layer 40B extends over the first layer 40A. The first layer 40A comprises a first portion 41A and a contact portion 42A while the second layer 40B comprises a first portion 41B, arranged on the first portion 41A, and a second portion 42B arranged on the contact portion 42A. It will be noted here that the pump 20-2 and the filter 30-2 could also be identical to the pump 20-1 and to the filter 30-1 of the first embodiment.

Preferably, the density of the second layer 40B is less than the density of the first layer 40A. Advantageously, the density in terms of number of pores per inch of the first layer 40A is between 40 and 50 ppi, for example is of the order of 45 ppi, and the density in terms of number of pores per inch of the second layer 40B is between 25 and 35 ppi, for example is of the order of 30 ppi.

Such a configuration allows the second layer 40B, the density of which is lower, to capture and retain the liquid 5, while the first layer 40A, which is more dense, is more efficient in transferring the liquid 5 to the filter 30-2. Thus, when the reservoir 10 is inclined, the second layer 40B can continue to supply liquid 5, which it has previously stored, to the first layer 40A so that said first layer 40A transfers it to the filter 30-2, which can prove to be particularly useful and effective when, in particular, the reservoir 10 is virtually empty of liquid 5.

Figure 4:
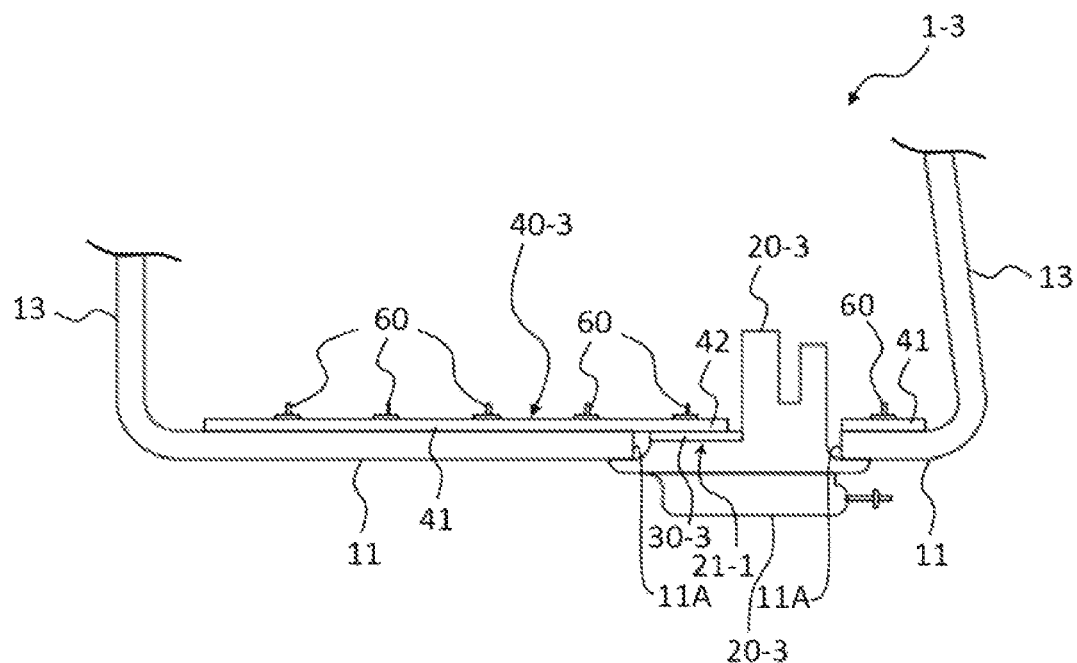
FIG. 4 is a partial perspective and sectional view of a third embodiment of the device according to the invention.

There is shown in FIG. 4 a third embodiment of the device 1-3 according to the invention. This third embodiment differs from the first embodiment in that the filter 30-3 is in the form of a plate and in that the filter 30-3 and the useful external surface 21-1 of the pump 20-3 extend into the orifice 11A of the bottom wall 11 of the reservoir 10 along a plane parallel to said bottom wall 11. In this third embodiment, the mat 40-3 thus extends entirely along a plane parallel to the plane of the bottom wall 11 of the reservoir 10 in order to partially cover the filter 30-3.

An example of implementation will now be described with reference to FIG. 5 in which the device 1-1 of the first embodiment has been shown inclined with respect to the terrestrial horizontal. In this case, the liquid 5 propagates by capillarity (arrows), from the location where it is stored in the reservoir 10, in the first portion 41 and then in the contact portion 42 until it reaches the filter 30-1 via the contact surface 50. The liquid 5 can thus be efficiently conveyed to the pump 20-1 only by capillarity.

In all the embodiments described above, the mat 40-1, 40-2, 40-3 can be fixed to the bottom wall 11 of the reservoir 10 using fastening members 60, for example clips, or any other suitable means. Likewise, in all the embodiments described above, the contact surface 50 between the contact portion 42 of the mat 40-1, 40-2, 40-3 and the filter 30-1, 30-2, 30-3 must be large enough to avoid pressure drops of the liquid 5 through the pump 20-1, 20-2, 20-3. Preferably, the contact surface 50 is greater than one third of the total external surface of the filter 30-1, 30-2, 30-3. By way of example, the contact surface 50 may be greater than or equal to 50 cm².

The device 1-1, 1-2, 1-3 according to the invention therefore makes it possible to convey the liquid 5 to the pump 20-1, 20-2, 20-3 in order both to avoid losses in suction of the liquid 5 in the pump 20-1, 20-2, 20-3 and to heat the part of the liquid 5 which is in the vicinity of the pump 20-1, 20-2, 20-3 using the heat given off by said pump 20-1, 20-2, 20-3, making it possible in particular to reduce the risk of the liquid 5 freezing in the reservoir 10. The mat 40-1, 40-2, 40-3 according to the invention is therefore a simple and effective means for efficiently conveying the liquid 5 to the pump 20-1, 20-2, 20-3 at atmospheric pressure, without any other additional mechanical means, which makes the device simple, resistant and inexpensive.

The invention claimed is:

1. A device for storing a liquid for a motor vehicle, said device comprising:
    a reservoir comprising a bottom wall;
    a pump mounted at an orifice formed at said bottom wall, the pump comprising at least one portion extending through said orifice, the at least one portion comprising at least one suction nozzle;
    a filter mounted on the at least one portion of the pump at said at least one suction nozzle; and
    a mat disposed inside the reservoir at least partly on the bottom wall, said mat moving the liquid by capillarity, the mat comprising a contact portion in contact with the filter at a contact surface in order to convey the liquid by capillarity to said filter.

2. The device as claimed in claim 1, wherein the contact between the contact portion of the mat and the filter is produced by elasticity.

3. The device as claimed in claim 1, wherein the contact surface between the contact portion of the mat and the filter is greater than one-third of the total external surface of the filter capable of being in direct contact with the liquid contained in the reservoir.

4. The device as claimed in claim 1, wherein the contact surface between the contact portion of the mat and the filter is greater than 50 cm².

5. The device as claimed in claim 1, wherein the mat comprises a single layer.

6. The device as claimed in claim 1, wherein the mat comprises a first layer disposed on the bottom wall, and a second layer disposed on the first layer.

7. The device as claimed in claim 6, wherein the density of the second layer is less than the density of the first layer.

8. The device as claimed in claim 1, wherein the filter extends along an axis or a longitudinal plane orthogonal to the plane along which the bottom wall of the reservoir extends.

9. The device as claimed in claim 1, wherein the mat is fixed to the bottom wall of the reservoir using fasteners.

10. The device as claimed in claim 2, wherein the contact surface between the contact portion of the mat and the filter is greater than one-third of the total external surface of the filter capable of being in direct contact with the liquid contained in the reservoir.

11. The device as claimed in claim 2, wherein the contact surface between the contact portion of the mat and the filter is greater than 50 cm².

12. The device as claimed in claim 3, wherein the contact surface between the contact portion of the mat and the filter is greater than 50 cm².

13. The device as claimed in claim 2, wherein the mat comprises a single layer.

14. The device as claimed in claim 3, wherein the mat comprises a single layer.

15. The device as claimed in claim 4, wherein the mat comprises a single layer.

16. The device as claimed in claim 2, wherein the mat comprises a first layer disposed on the bottom wall, and a second layer disposed on the first layer.

17. The device as claimed in claim 3, wherein the mat comprises a first layer disposed on the bottom wall, and a second layer disposed on the first layer.

18. The device as claimed in claim 4, wherein the mat comprises a first layer disposed on the bottom wall, and a second layer disposed on the first layer.

19. The device as claimed in claim 2, wherein the filter extends along an axis or a longitudinal plane orthogonal to the plane along which the bottom wall of the reservoir extends.

20. A motor vehicle comprising:
the storage device as claimed in claim 1.

\* \* \* \* \*